United States Patent [19]

Kempken

[11] Patent Number: 5,129,662
[45] Date of Patent: Jul. 14, 1992

[54] CHUCK

[75] Inventor: Rainer Kempken, Erkrath, Fed. Rep. of Germany

[73] Assignee: Forkardt GmbH, Düsseldorf, Fed. Rep. of Germany

[21] Appl. No.: 705,098

[22] Filed: May 24, 1991

[30] Foreign Application Priority Data

May 25, 1990 [DE] Fed. Rep. of Germany ....... 4016775

[51] Int. Cl.$^5$ .............................................. B23B 31/16
[52] U.S. Cl. ..................................... 279/123; 279/124
[58] Field of Search ..................... 279/123, 1 SJ, 110, 279/118, 119, 121

[56] References Cited

U.S. PATENT DOCUMENTS

| 4,362,306 | 12/1982 | Rohm | 279/123 X |
| 4,639,001 | 1/1987 | Berado | 279/123 X |
| 4,969,654 | 11/1990 | Theodolin | 279/123 X |

FOREIGN PATENT DOCUMENTS

3437505 5/1985 Fed. Rep. of Germany .

Primary Examiner—Steven C. Bishop
Attorney, Agent, or Firm—Robert W. Becker & Associates

[57] ABSTRACT

A chuck having at least one jaw assembly that is radially displaceably guided in a chuck body and comprises a driving jaw and a clamping jaw. A coupling member is mounted in the driving jaw in such a way as to be displaceable at right angles to guides provided in the chuck body for the jaw assembly, with the coupling member being displaceable between an uncoupling position and a coupling position in which the coupling member is in positive engagement with a back side of the clamping jaw. An eccentric unit is rotatably mounted in the driving jaw for effecting the displacement of the coupling member, with the eccentric unit having a nonconcentric shaft that is disposed in a transverse slot of the coupling member. The ecccentric unit is also mounted in a driving jaw in such a way as to be axially displaceable between two end positions, with the eccentric unit being provided with a stop member that in one of the end positions thereof is disposed in the transverse slot of the coupling member when the latter is in its coupling position to thereby positively hold the coupling member in such coupling position.

7 Claims, 7 Drawing Sheets

CHUCK

BACKGROUND OF THE INVENTION

The present invention relates to a chuck having at least one jaw assembly that is radially displaceably guided in a chuck body and comprises a driving jaw and a clamping jaw, with the back side of the clamping jaw being adapted to be positively coupled with a coupling member that is mounted in the driving jaw in such a way as to be displaceable at right angles to guide means provided in the chuck body for the jaw assembly, with the coupling member being adapted to be uncoupled from the clamping jaw via eccentric means rotatably mounted in the driving jaw.

A chuck of this general type, in the form of a three-jaw chuck, is disclosed in DE-OS 34 37 505. With this known chuck construction, the axially fixed, yet rotatably mounted eccentric means engages in a transverse groove or slot that is provided on the upper side of the coupling member, so that rotation of the eccentric means results in an axial displacement of the coupling member. In a forward end position, teeth of the coupling member engage teeth formed on the back side of the clamping jaw, thereby positively holding the clamping jaw on the driving jaw in a form-locking manner. When the coupling member is displaced by the eccentric means into its rearward end position, the coupling member and the clamping jaw are uncoupled from one another, so that the clamping jaw is released from the driving jaw and can be removed from the chuck body in a radial direction.

With this known construction, in order to prevent an accidental turning of the eccentric means that would retract the coupling member out of its coupling position, a spring-loaded piston is provided in the coupling member that in the coupling position thereof engages in a transverse slot of the eccentric means. Unfortunately, this means for preventing rotation of the eccentric means depends upon the reliable effectiveness of the relatively small spring that loads the piston, and also requires that the path of the piston not be obstructed with dirt, chips, or other shavings.

It is therefore an object of the present invention to improve a chuck of the aforementioned general type in such a way that with a few sturdy components, a reliable, positive fixation of the coupling member in its coupling position is provided.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The chuck of the present invention is characterized primarily in that the eccentric means, a nonconcentric shaft of which is disposed in a transverse slot of the coupling member, is mounted in such a way as to be axially displaceable between two end positions, and is provided with a stop member that in one of the end positions of the eccentric means is disposed in the transverse slot of the coupling member when the coupling member is in its coupling position to thereby positively hold the coupling member in the coupling position.

Thus, the advantage provided by the present invention is that the eccentric means serves not only for moving the coupling member between its coupling and uncoupling positions, but also serves to positively hold the coupling member in its coupling position. In so doing, the stop member of the eccentric means, which can be shifted parallel to its axis of rotation, is positively disposed in the transverse slot of the coupling member, so that the force exerted upon the coupling member from the clamping force via the surfaces of the form engagement (the teeth) is transmitted via defined surfaces and via the positioning of the eccentric means to the driving jaw; at the same time, the eccentric means is prevented from turning in the transverse slot as a consequence of the positive engagement of its stop member. Consequently, the inventive construction eliminates the need for an additional, spring-loaded and hence problematic locking piston.

Pursuant to one specific embodiment of the present invention, the eccentric means is formed by two circular cylindrical bearing disks that are rotatably mounted in a longitudinal bore of the driving jaw and are interconnected by a shaft that is nonconcentrically disposed relative to the axis of rotation of these bearing disks; this nonconcentric shaft is disposed in the transverse slot of the coupling member, which in the region between the bearing disks is displaceably mounted in a transverse bore of the driving jaw. The inventive eccentric means can be easily and economically manufactured by a turning machining operation, and can be reliably mounted in the longitudinal bore of the driving jaw via appropriately dimensioned bearing surfaces.

Pursuant to another specific embodiment of the present invention, the stop member, which in the coupling position of the coupling member is disposed in the transverse slot thereof, is formed at the end of the nonconcentric shaft, i.e. upon the inner surface of one of the bearing disks, so that this stop member is integrally formed with the eccentric means.

Pursuant to one preferred specific embodiment of the present invention, the eccentric means is loaded by a spring that is disposed between the driving jaw and the bearing disk that carries the stop member; this spring moves the eccentric means into one of its end positions as soon as the coupling member is placed into the coupling position via rotation of the eccentric means. The spring that is used for accomplishing this can be adequately sized and is protected from dirt and shavings within the driving jaw.

If pursuant to a further feature of the present invention the stop member is disposed on the radially inwardly disposed bearing disk of the eccentric means, and the spring loads the eccentric means radially outwardly in its axial direction, the spring force is enhanced by the centrifugal force of the rotating chuck, which further increases the reliability of the inventive chuck.

To enable an operation of the eccentric means that is as straightforward as possible, the outer surface of the radially outwardly disposed bearing disk of the eccentric means is provided with a key face for an actuating tool that can be withdrawn from the eccentric means only in that end position thereof when it is locked in position by the stop member. Pursuant to one preferred specific embodiment of the present invention, to accomplish this the key face is embodied as an inclined slot from which a corresponding key or rib of the actuating tool can be withdrawn only when the outer surface of the radially outwardly disposed bearing disk of the eccentric means is disposed in the same plane as the outer surface of the driving jaw.

To prevent the clamping jaws from being flung out of the chuck body in an uncontrolled manner during startup of the chuck when the coupling members are in the retracted uncoupling position, it is proposed pursuant to a further specific embodiment of the present invention that the coupling member, on its back side which is remote from the set of teeth, cooperate via control surfaces with a detent in such a way that an uncoupling of the clamping jaw from the driving jaw is possible only in a prescribed position of the driving jaw and that when the chuck piston causes the driving jaw to move out of this position, the coupling member is automatically moved into the coupling position via the control surfaces. In this way, an uncoupling of the clamping jaw and driving jaw is possible only in a specific position of the driving jaw and hence of the chuck piston. If the chuck piston is accidentally or unintentionally moved out of this position, the coupling members are automatically returned to the coupling position.

Pursuant to one preferred specific embodiment of the present invention, the detent is embodied as a pin that is disposed in the chuck body and is provided with an angled surface means that cooperates with correspondingly embodied inclined surface means of a recessed portion that is provided in the back side of the coupling member. This inventive configuration of the detent and the back side of the coupling member enables a reliable automatic control of the coupling member with simple means.

It is finally proposed pursuant to the present invention to dispose a spring-loaded arresting member in the driving jaw parallel to the coupling member; this arresting member facilitates the adjustment or positioning of the clamping jaws in a prescribed position prior to operation of the coupling member.

Further specific features of the present invention will be described in detail subsequently.

DESCRIPTION OF THE PREFERRED EMBODIMENTS

Referring now to the drawings in detail, the illustrated chuck involves a three-jaw chuck and has a chuck body 1 that is secured via two screws 2 to the spindle flange of a non-illustrated machine tool. A jaw assembly is displaceably mounted in radial guide means 1a and 1b of the chuck body 1; this chuck assembly comprises a driving jaw 3 and a clamping jaw 4. The driving jaw 3 has an essentially circular cross-sectional configuration, with the radially inwardly disposed end of the driving jaw 3 being provided with wedge surfaces 3a that extend at an angle relative to the axis of rotation of the chuck body 1. These wedge surfaces 3a cooperate with wedge surfaces 5a of a chuck piston 5 that is axially displaceably disposed in the chuck body 1. Consequently, an axial movement of the chuck piston 5 results in a radial movement of the three driving jaws 3.

Figure 2:
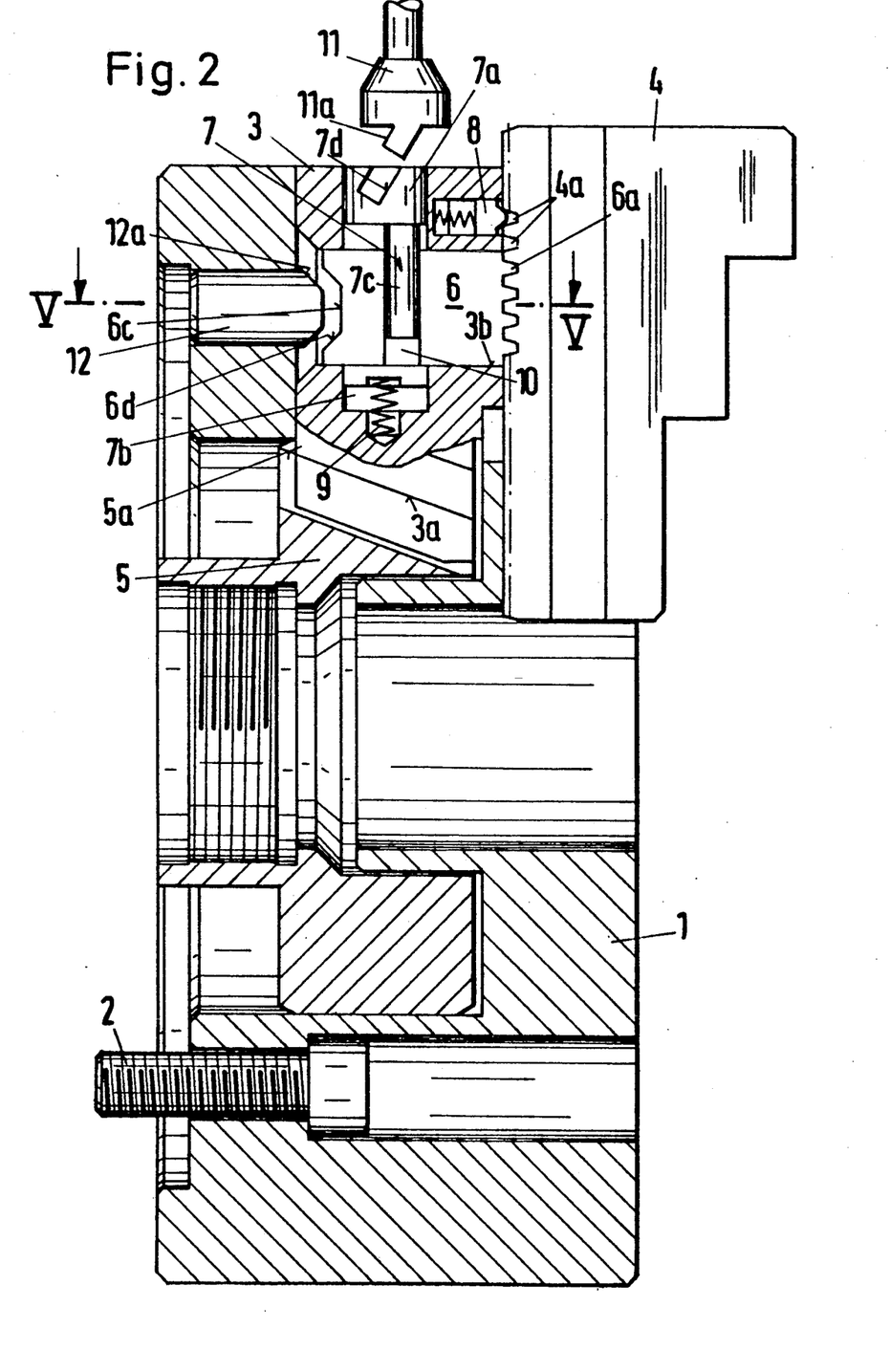
FIG. 2 is a longitudinal cross-sectional view taken along the line II—II in FIG. 1.
Figure 3:
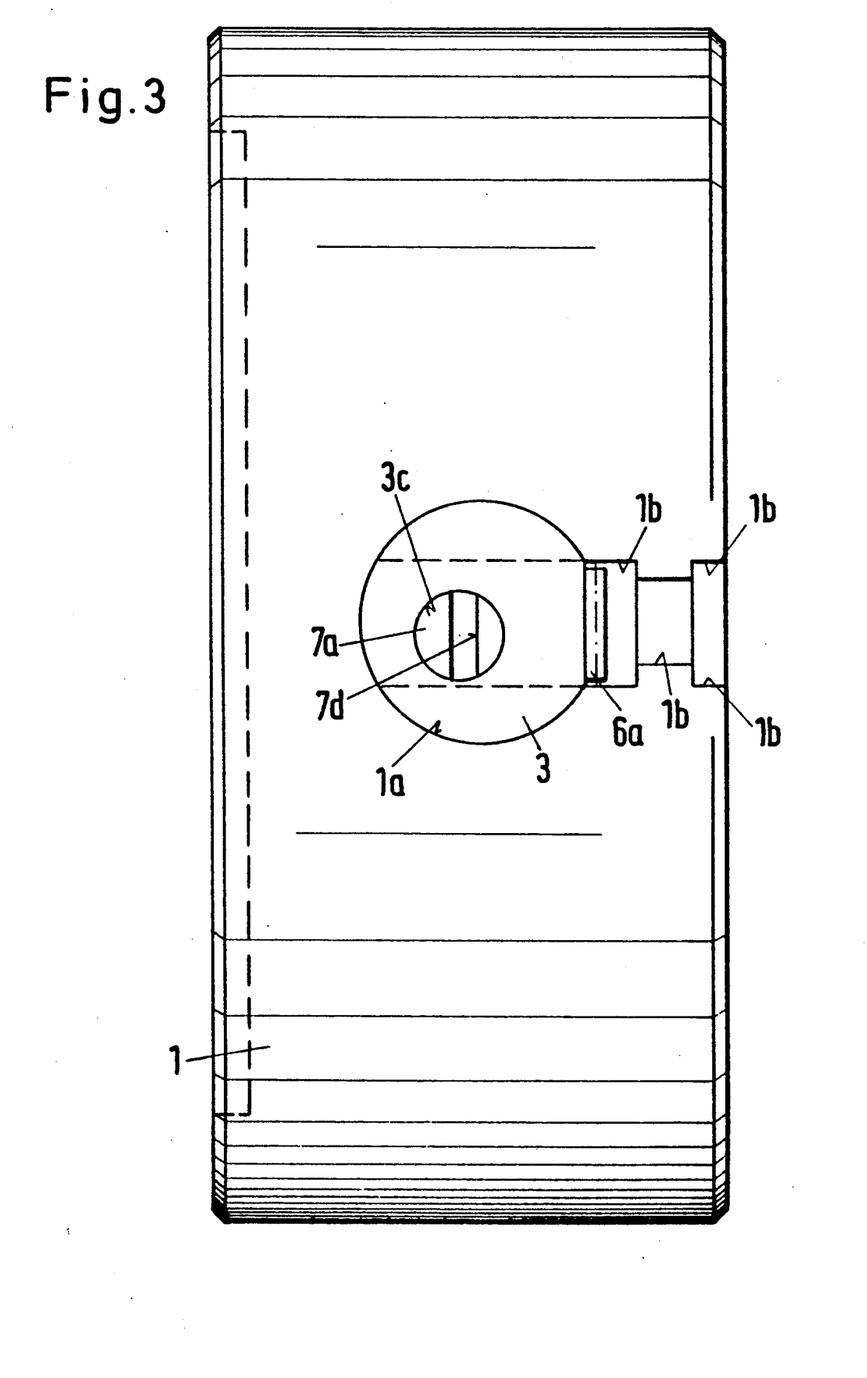
FIG. 3 is a top view of the chuck of FIGS. 1 and 2, but without the clamping jaw that is indicated in FIG. 2 and in the upper portion of FIG. 1.

The driving jaws 3 and the clamping jaws 4, which are guided in separate radial guide means 1a and 1b of the chuck body 1, can be coupled with one another via a coupling member 6 that is mounted in a transverse bore 3b of the driving jaw 3 in such a way that the coupling member 6 is displaceable in its longitudinal direction. Disposed on the front side of the coupling member 6 is a set of teeth 6a that mesh with a corresponding set of teeth 4a disposed on the back side of the clamping jaw 4. In FIG. 2, the coupling member 6 and the clamping jaw 4 are shown in their coupling position; the uncoupling position is shown in FIG. 4.

Figure 9:
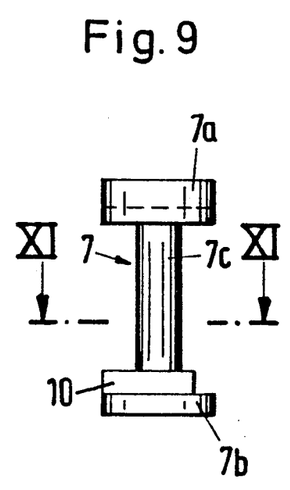
FIG. 9 is a side view of the eccentric means.
Figure 10:
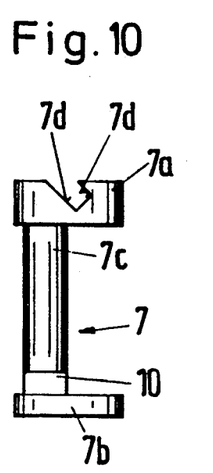
FIG. 10 is a side view of the eccentric means, but rotated by 90° from the position shown in FIG. 9.
Figure 11:
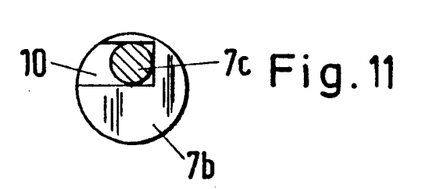
FIG. 11 is a cross-sectional view through the eccentric means and is taken along the line XI—XI in FIG. 9.

An eccentric means 7 is provided in order to be able to shift the coupling member 6 between the coupling and uncoupling positions. The eccentric means 7 is disposed in a longitudinal bore 3c of the driving jaw 3, with structural details of the eccentric means being disclosed in FIGS. 9 to 11. The eccentric means 7 comprises two circular cylindrical bearing disks 7a and 7b that are rotatably mounted in the longitudinal bore 3c of the driving jaw 3; the eccentric means also comprises a shaft 7c that interconnects these bearing disks 7a and 7b and that is disposed eccentrically, i.e. nonconcentrically, relative to the axis of rotation thereof. The shaft 7c extends into a transverse slot 6b of the coupling member 6, as can be best seen from FIGS. 5 and 6. Consequently, a rotational movement of the eccentric means 7 in the longitudinal bore 3c of the driving jaw 3 results in an axial displacement of the coupling member 6 in the transverse bore 3b of the driving jaw 3. Whereas in the forward end position of the coupling member 6, which forms the coupling position, the set of teeth 6a of the coupling member mesh with the set of teeth 4a of the clamping jaw 4, in the other end position of the coupling member, which forms the uncoupling position, the set of teeth 6a are completely withdrawn from the set of teeth 4a of the clamping jaw 4, so that in this position the clamping jaw 4 can be removed from the chuck body 1 in a radial direction, as can be seen from FIG. 4.

Figure 1:
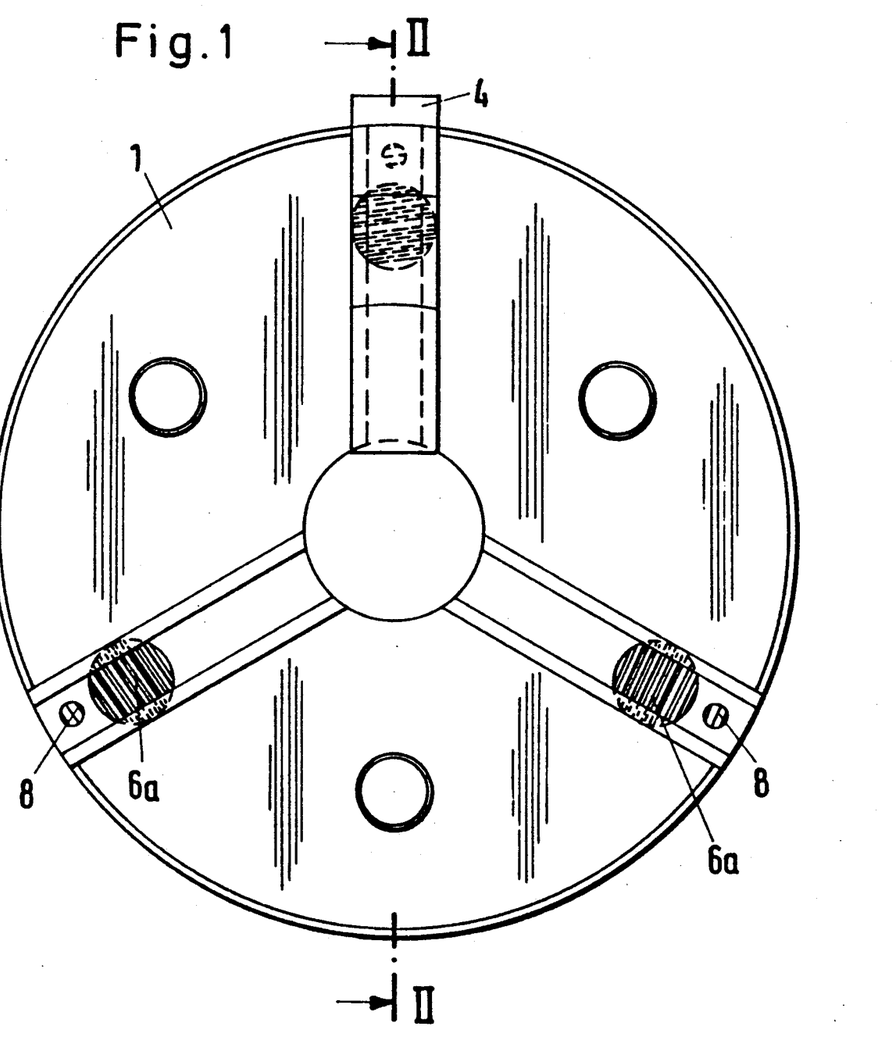
FIG. 1 is a front view of one exemplary embodiment of the inventive chuck in the form of a three-jaw chuck that is to be mounted on the spindle or arbor of a machine tool.
Figure 4:
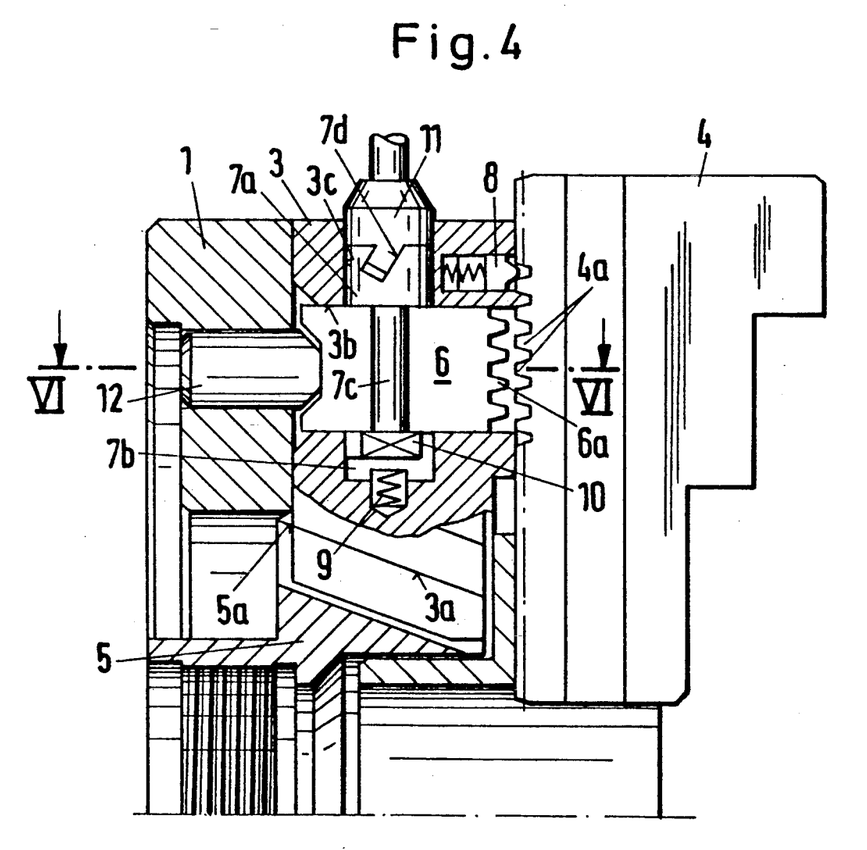
FIG. 4 is a cross-sectional view corresponding to the upper half of FIG. 2, yet with the coupling member in the uncoupling position.

In the illustrated embodiment, when the clamping jaw 4 is shifted in its guide means 1b of the chuck body 1, a certain resistance must be overcome; this resistance is produced by a spring-loaded arresting member 8, which is illustrated in the lower half of FIG. 1 as well as in FIGS. 2 and 4. This arresting member 8 includes a tooth that engages in the set of teeth 4a of the clamping jaw 4, whereby this tooth can, however, be pressed back during radial shifting of the clamping jaw 4 by overcoming the spring force.

To enable the eccentric means 7 to be able to turn, the outer side of the upper bearing disk 7a of the eccentric means is provided with a key face 7d Disposed between the lower bearing disk 7b of the eccentric means 7 and the driving jaw 3 is a spring 9 that urges the eccentric means 7 in a radially outer direction. The spring 9 can best be seen in FIGS. 2 and 4.

Figure 5:
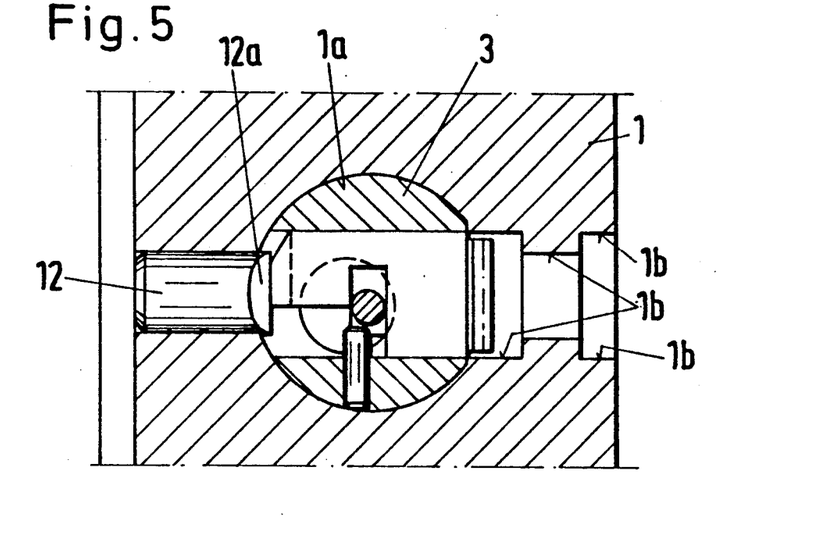
FIG. 5 is a cross-sectional view taken along the line V—V in FIG. 2, with the coupling member in the coupling position.
Figure 6:
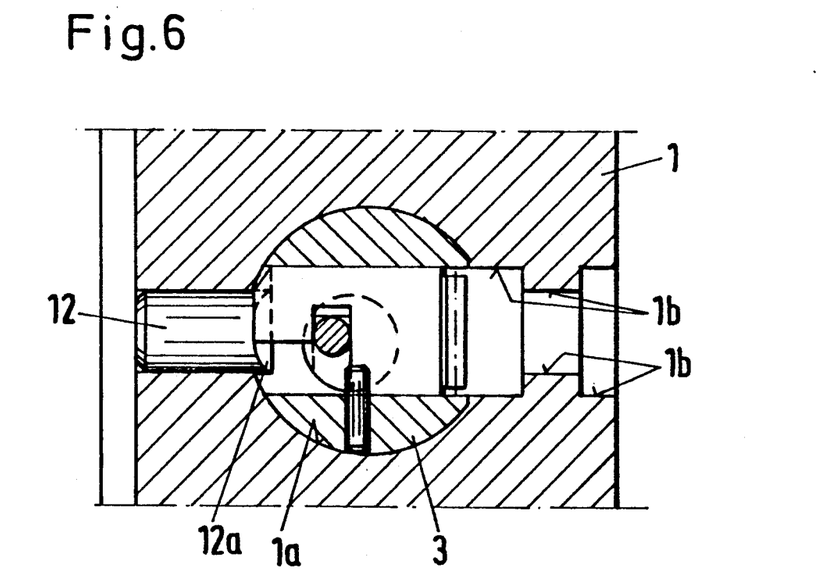
FIG. 6 is a cross-sectional view taken along the line VI—VI in FIG. 4, with the coupling member retracted into the uncoupling position.

Formed at the lower end of the shaft 7c, i.e. on the inner surface of the lower bearing disk 7b of the eccentric means 7, is a stop member 10 that extends into the transverse slot 6b of the coupling member 6 when the coupling member is in its coupling position (see FIGS. 2 and 5). In this position, due to the force of the spring the eccentric means 7 is shifted radially outwardly in such a way that the stop member 10 comes to rest within the transverse slots 6b of the coupling member 6. In this way, an accidental or unintentional rotation of the eccentric means 7, and hence a withdrawal of the coupling member 6 out of the coupling position, is prevented; a displacement of the coupling member 6 out of its coupling position is intentionally possible only by pressing the eccentric means 7 against the force of the spring 9 and into the interior of the driving jaw 3 via an actuating tool 11. Only after the stop member 10 has left the transverse slot 6b of the coupling member 6 can the eccentric means 7 be rotated by the actuating tool 11, which engages the key face 7d of the eccentric means 7. Since the spring 9 is disposed between the driving jaw 3 and the lower bearing disk 7b of the eccentric means 7, its effect is enhanced by the centrifugal force of the chuck when the latter is rotated. This increases the reliability of the above-described positive interlocking not only of the eccentric means 7 but also of the coupling member 6 in the coupling position.

Figure 7:
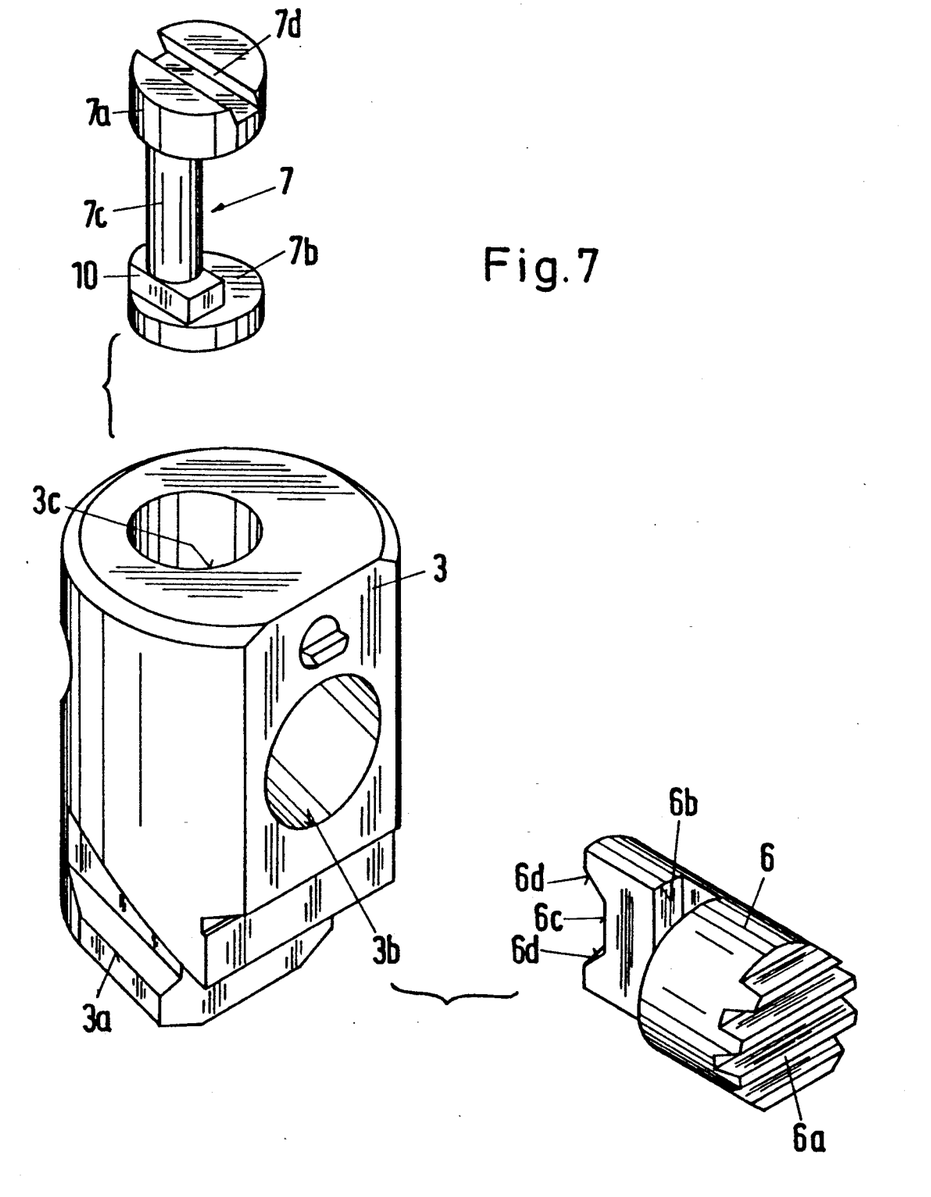
FIG. 7 is a perspective, exploded view of the driving jaw, the eccentric means, and the coupling member.
Figure 8:
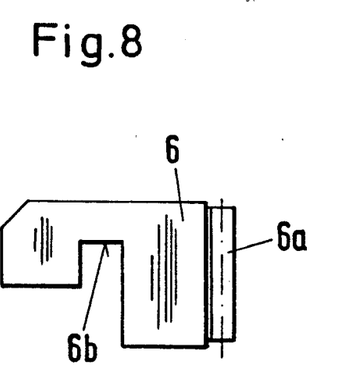
FIG. 8 is a top view of the coupling member.

As can be seen from FIGS. 2, 4 and 7, the key face 7d is embodied as an inclined slot with which a corresponding key or rib 11a of the actuating tool 11 meshes. As a consequence of this inclined tongue and groove positioning, the actuating tool 11 can be placed upon the eccentric means 7, and removed therefrom, only when the outer surface of the radially outer bearing disk 7a of the eccentric means 7 is disposed in the same plane as the outer surface of the driving jaw 3. In this end position, the stop member 10 enters the transverse slot 6b of the coupling member 6, which is disposed in the coupling position This ensures that the actuating tool 11 can be withdrawn only when the clamping jaw 4 is properly locked in place by the coupling member 6.

As can be seen particularly clearly in FIGS. 2 and 4, it is possible to withdraw the coupling member 6 out of its coupling position (FIG. 2) into the uncoupling position (FIG. 4) only when the driving jaw 3, and hence the chuck piston 5, are in a certain position. This is effected by a detent 12 that is embodied as a pin that is disposed in the chuck body 1 and is provided with angled surface means 12a. This angled surface means of the detent 12 operates with correspondingly shaped inclined surface means 6d that are formed in a recessed portion 6c in the back side of the coupling member 6.

If the driving jaw 3 is in the prescribed uncoupling position, the recessed portion 6c in the back side of the coupling member 6 permits a retraction or withdrawal of the coupling member via the eccentric means 7. The inclined surface means 6d and the angled surface means 12a on the coupling member 6 and the detent 12 respectively act control surfaces and effect an automatic displacement of the coupling member 6 into the coupling position illustrated in FIG. 2 when, in the uncoupling position of FIG. 4, the chuck piston 5 is to be actuated. In this case, the control surfaces 6d and 12a press the coupling member 6 into the coupling position as soon as a relative movement is effected between the driving jaw 3 and the detent 12 that is disposed in the chuck body 1. This prevents the clamping jaws 4 from being flung out of the chuck body 1 in an uncontrolled manner when the chuck is rotated, without having to previously actuate the eccentric means 7 to produce the prescribed coupling between the clamping jaws 4 and the driving jaws 3.

The present invention is, of course, in no way restricted to the specific disclosure of the specification and drawings, but also encompasses any modifications within the scope of the appended claims.

What I claim is:

1. A chuck body having at least one jaw assembly that is radially displaceably guided in a chuck body and comprises a driving jaw and a clamping jaw, said chuck further comprising:

a coupling member that is mounted in said driving jaw in such a way as to be displaceable at right angles to guide means provided in said chuck body for said jaw assembly, with said coupling member being displaceable between an uncoupling position and a coupling position in which said coupling member is in positive engagement with a back side of said clamping jaw; and eccentric means rotatably mounted in said driving jaw for effecting said displacement of said coupling member between said coupling and said uncoupling position thereof, with said eccentric means having a nonconcentric shaft that is disposed in a transverse slot of said coupling member, with said eccentric means also being mounted in said driving jaw in such a way as to be axially displaceable between two end positions, with said eccentric means being provided with a stop member that in one of said end positions of said eccentric means is disposed in said transverse slot of said coupling member when said coupling member is in its coupling position to thereby positively hold said coupling member in said coupling position;

said eccentric means further comprising two circular cylindrical bearing disks that are rotatably mounted in a longitudinal bore of said driving jaw, with said bearing disks being interconnected by said nonconcentric shaft, which is nonconcentrically disposed relative to an axis of rotation of said bearing disks, and with said coupling member being displaceably mounted in a transverse bore that is provided in said driving jaw in a region between said bearing disks of said eccentric means;

an outer surface of a radially outwardly disposed one of said bearing disks being provided with a key face for receiving an actuating tool that is removable from said eccentric means only in said one end position thereof where said eccentric means is locked in place by said stop member; and said key face being embodied as an inclined slot and said actuating tool having a corresponding key that is removable from said inclined slot only when said outer surface of said radially outwardly disposed bearing disk of said eccentric means is essentially flush with an outer surface of said driving jaw.

2. A chuck according to claim 1, in which said stop member of said eccentric means is disposed at an end of said nonconcentric shaft on an inner surface of one of said bearing disks of said eccentric means.

3. A chuck according to claim 2, which includes a spring disposed between said driving jaw and that bearing disk on which said stop member is disposed, with said spring loading said eccentric means and displacing same into said one end position thereof as soon as said coupling member is displace into its coupling position via rotation of said eccentric means.

4. A chuck according to claim 3, in which said stop member is disposed on a radially inwardly disposed one of said bearing disks, and said spring urges said eccentric means radially outwardly in an axial direction thereof.

5. A chuck according to claim 2, which includes a detent that is provided with first control surface means, and in which said coupling member, on a back side thereof remote from a set of teeth, is provided with second control surface means, with said first and second control surface means cooperating with one another in such a way that uncoupling of said clamping jaw from said driving jaw is possible in only one prescribed position of said driving jaw, and when said driving jaw is displaced from this position via a chuck piston, said coupling member is automatically moved into its coupling position via said first and second control surface means.

6. A chuck according to claim 5, in which said detent is embodied as a pin that is disposed in said chuck body and is provided with said first control surface means in the form of angled surface means, and in which said back side of said coupling member is provided with a recessed portion that is provided with said second control surface means in the form of corresponding inclined surface means.

7. A chuck according to claim 1, in which a spring-loaded arresting member that acts upon said clamping jaw is disposed in said driving jaw parallel to said coupling member.

* * * * *